United States Patent [19]

Cave

[11] 4,118,981
[45] Oct. 10, 1978

[54] FLOWMETER

[75] Inventor: Ellis K. Cave, Garland, Tex.

[73] Assignee: Arcadia Refining Company, Tyler, Tex.

[21] Appl. No.: 809,920

[22] Filed: Jun. 24, 1977

[51] Int. Cl.$^2$ .............................................. G01F 1/58
[52] U.S. Cl. .............................................. 73/194 EM
[58] Field of Search .................................... 73/194 EM

[56] References Cited

U.S. PATENT DOCUMENTS

| 3,550,446 | 12/1970 | Tucker et al. | 73/194 EM |
| 3,965,738 | 6/1976 | Watanabe | 73/194 EM |
| 4,010,644 | 3/1977 | Bonfig et al. | 73/194 EM |

Primary Examiner—Charles A. Ruehl
Attorney, Agent, or Firm—Lane, Aitken, Dunner & Ziems

[57] ABSTRACT

In a flowmeter, a permanent magnet is employed to apply a DC magnetic field to the liquid flowing through a pipe section. The magnet is mounted in a U-shaped housing adapted to fit over a nonmagnetic, nonconductive pipe section. Electrically conducting probes extend through the pipe section to contact liquid flowing through the pipe section at points spaced along a line perpendicular to the direction of the field applied by the magnet and perpendicular to the flow. As the magnet is brought into position over the pipe section, the approach of the magnet to the pipe section is detected by the closing of a reed switch. In response to the reed switch closing, a signal voltage proportional to the voltage across the two probes in contact with the liquid flowing through the pipe is stored on a capacitor. Then, three-fourths of a second later, after there has been sufficient time for the magnet to have been moved into position to apply the full strength of the magnetic field to the flowing liquid, a second signal voltage proportional to the voltage across the two probes is stored on a second capacitor. The difference between the stored voltages is detected to provide an indication of the rate of flow through the pipe section.

6 Claims, 5 Drawing Figures

FLOWMETER

BACKGROUND OF THE INVENTION

This invention relates to a flowmeter and, more particularly, to a flowmeter of the magnetic induction type which measures the rate of flow through a pipe by applying a magnetic field to the flowing liquid in the pipe and then detecting the resulting induced voltage generated between two probes in contact with the flowing liquid.

When a magnetic field is applied to an electrically conducting flowing liquid, the liquid will act as an electrically conducting wire moving through a magnetic field and generate a voltage across the body of the liquid as it moves through the applied magnetic field. The voltage will be generated perpendicular to the applied magnetic field. Thus, if the magnetic field is applied to a pipe section through which an electrically conducting liquid is flowing and two probes are provided to be in electrical contact with the liquid at points on opposite sides of the pipe positioned on a line perpendicular to the magnetic field, a voltage will be generated on the probes, which voltage will vary with the rate of flow. It has been proposed in the prior art to make use of this phenonomena to measure the rate of flow through a pipeline by using a DC magnetic field. However, the voltage produced by the probe is subject to large drifts in value and the proposed flowmeter failed to provide a reliable indication of the flow rate. To overcome the problem of voltage drift, an AC magnetic field was applied to the pipe section through which the flow rate is to be measured and the resulting AC induced voltage was detected and filtered at the frequency of the applied AC field to eliminate the effect of DC drift. This flowmeter of the prior art provided a reliable indication of the flow rate, but the electromagnet in order to produce an output siganl of sufficient magnitude was large and cumbersome and required a large amount of power to generate the alternating field. Another system of the prior art, instead of applying an alternating field to the pipe section, applied a DC field by means of an electromagnet and the output voltage from the applied DC field was stored. Subsequently, the DC field applied by the electromagnet was reversed and the output voltage was again detected. The difference in the two output voltages detected was then measured to provide an indication of the flow rate. This system also required large electromagnets and required a substantial amount of power to reverse the fields in a short enough period of time to achieve a reliable flow rate measurement.

SUMMARY OF THE INVENTION

The present invention provides a flowmeter which employs a permanent magnet to apply a DC magnetic field to the liquid flowing through a pipe section and, therefore, does not require large cumbersome electromagnets or a large amount of power to generate the magnetic field. Yet, the flowmeter of the present invention, nevertheless, avoids the problem of signal drift. In accordance with the invention, a permanent magnet is mounted in the U-shaped housing adapted to fit over a nonmagnetic, nonconducting pipe section. Electrically conducting probes extend through the pipe section to contact liquid flowing through the pipe section at points along a line perpendicular to the direction of the field to be applied by the magnet and perpendicular to the flow. As the magnet is being brought into position over the pipe section, the approach of the magnet to the pipe section is detected by a reed switch. This reed switch closes in response to the approach of the permanent magnet before the magnet gets into position to apply the full strength magnetic field to the liquid flowing through the pipe. A signal voltage proportional to the voltage across the two probes in contact with the liquid flowing through the pipe is stored on a capacitor at the time the reed switch closes. This voltage will thus correspond to that existing across the probes when a small magnetic field is applied to the flowing liquid. Then, three-fourths of a second later, after there has been sufficient time for the magnet to have been moved into position to apply the full strength of the magnetic field to the flowing liquid, a second signal voltage proportional to the voltage across the two probes is stored on a second capacitor. The difference between the two stored voltages is detected to provide a reliable indication of the instantaneous rate of flow through the pipe section. Because the measurement is achieved by a permanent magnet, the flowmeter of the present invention can be incorporated in a small portable instrument.

Accordingly, an object of the present invention is to provide an improved flowmeter for measuring the rate of flow of liquids in a pipe line.

Another object of the present invention is to provide a portable flowmeter for measuring the rate of flow.

A still further object of the present invention is to provide a reliable flowmeter which employs a permanent magnet to apply a magnetic field to the flowing fluid in order to measure the rate of flow.

Yet another object of the present invention is to provide a simple, relatively inexpensive flowmeter which provides a reliable indication of the instantaneous rate of flow through a pipe section.

A still further object of the present invention is to facilitate accurate flow measurement.

Further objects and advantages of the present invention will become apparent as the following detailed description of the invention unfolds when taken in conjunction with the drawings described below.

DESCRIPTION OF A PREFERRED EMBODIMENT

Figure 1:
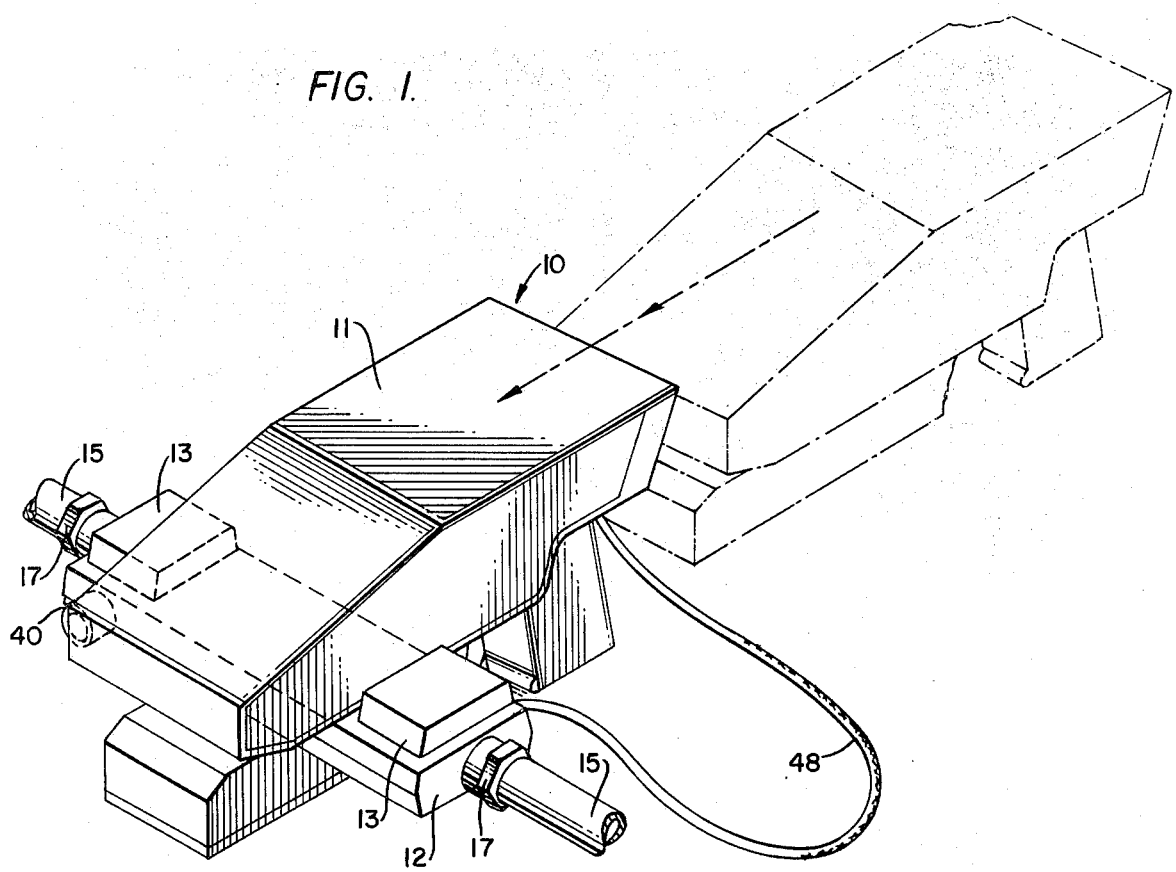
FIG. 1 is a perspective view of the flowmeter of the present invention showing the measuring instrument in position over the pipe section to take a measurement.
Figure 2:
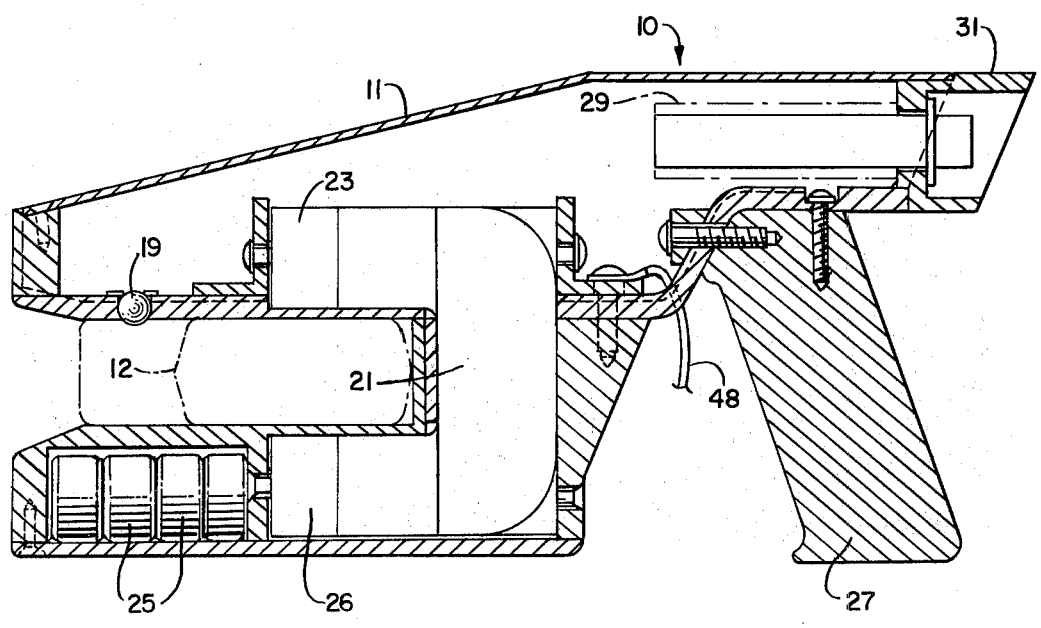
FIG. 2 is a sectional view taken through the flowmeter with the instrument in position on the pipe section.

As shown in FIG. 1 and FIG. 2, the flowmeter of the present invention comprises a portable hand-held unit 10, which fits over a rectangular profile of a special pipe section 12. The pipe section 12 is connected to receive the fluid flow, the flow rate of which is to be measured. As shown in FIG. 1, the portable unit 10 has a U-shaped housing 11 which is positioned on the pipe section 12 by guides 13 provided on the pipe section 12. Fluid flows into and out of the special pipe section through pipe connections 15 attached to the pipe section 12 by fittings 17. The housing 11 is provided with a ball roller 19 on the upper leg of the U-shaped housing on the inner surface thereof to provide a detent feel when the housing 11 is properly placed over the pipe section 12. A U-shaped permanent magnet 21 is mounted in the housing 11 to apply a magnetic field to the fluid flowing through the pipe section 12 via pole pieces 23. The pole pieces 23 direct the magnetic field from magnet 21 directly across the pipe section 12.

Batteries 25 are mounted in the extremity of the lower leg of the U-shaped housing 11 to provide power for the electronic measuring circuit of the instrument which is mounted on a circuit board in the upper leg of the housing. A gun handle 27 is mounted on the rear extension of the housing 11 to facilitate handling the portable unit 10. A meter 29 is mounted in the rear extension of the housing 11 having its dial facing rearwardly to be visible through the rear wall of housing shaded by the shield 31. The measurements taken by the instruments are read off the dial of the meter 29, which is implemented by a milliameter.

Figure 3:
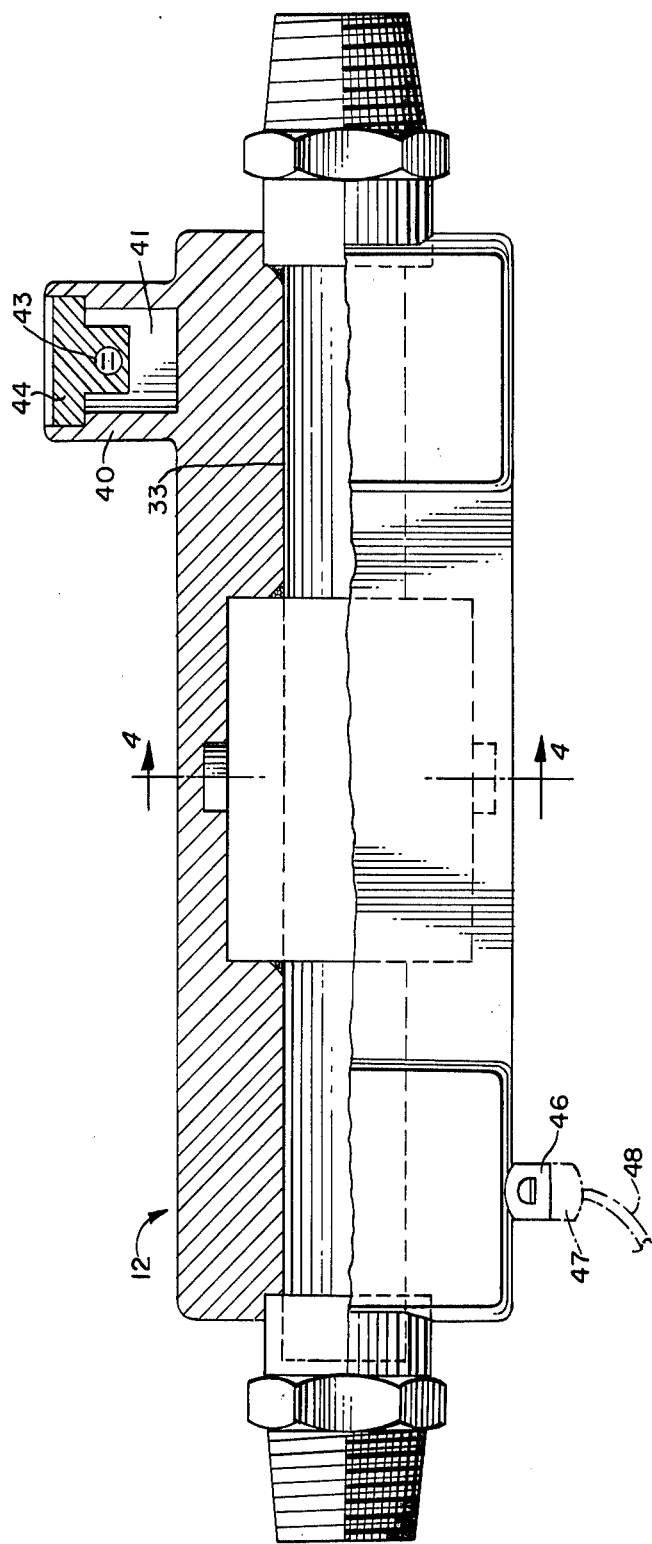
FIG. 3 is a partial sectional view illustrating the pipe section to which the portable instrument of the flowmeter is applied.
Figure 4:
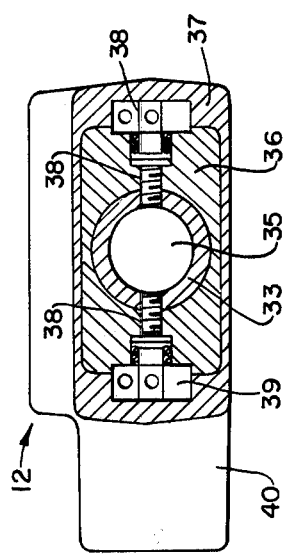
FIG. 4 is a cross-sectional view of the pipe section taken along lines 4—4 of FIG. 3.

As best shown in FIGS. 3 and 4, the pipe section 12, while having a rectangular external profile, defines by a tubular envelope 33 a round tubular passage for the fluid flow through the pipe section.

The tubular envelope 33 is mounted in a block 36 which is enclosed in casing 37. Electrically conducting probes 38 in the form of contact screws are threaded into opposite sides of the block 36 and through clearance holes in the tube 33. The electrical contact screws make contact with the fluid flowing through the tube 33 and thus serve as probes. Recesses are provided on opposite sides of the block 36 for the heads of the contact screws. Electrical contacts 39 engage the contact screws and are enclosed by the outer casing 37 of the special pipe section. Alternatively, the probes may be provided by threaded rods made of insulating material with electrically conducting centers. The outer casing 37 has on one side thereof and near one end thereof a tubular extension 40 which defines a chamber 41 in which a reed switch 43 is located. The reed switch 43 is mounted in a fixture 44 which in turn is mounted in the tubular extension 40. The reed switch 43 is designed to close in response to a relatively weak magnetic field applied perpendicularly to the plane of the drawing of FIG. 3. Electrical connections between the circuitry mounted in the housing 11 and the contacts 39 and the reed switch 43 are provided by means of an electrical receptical 46 provided on the pipe section 12 and an electrical plug 47 which fits into the receptical and is connected to the housing by means of a flexible electrical cable 48.

When the instrument is to be used to make a flow measurement, the plug 47 must be connected with the receptical 46 before the housing 11 is moved into position over the pipe section 12. This applies power to the system. After this connection is made, the housing is moved into position over the pipe section 12 from the opposite side on which the reed switch 43 is located as illustrated in FIG. 1. As the magnet in the housing approaches the pipe section and before the poles of the magnet get into the position over the pipe section, the magnetic field generated by the magnet extending out in front thereof will cause the contacts of the reed switch 43 to close. In response to the closure of the reed switch, the electrical circuit in the housing 11 will store a signal proportional to the voltage level produced between the probes 38. This voltage level will be that produced between the probes 38 before the main strength of the magnetic field is applied to the liquid flowing through the tube 33. Three-fourths of a second later, which is after a sufficient time interval for the pole pieces 23 of the permanent magnet to have come into position on opposite sides of the tube 33, the electronic circuit will again store a signal proportional to the voltage produced across the probes 38. The difference between the two stored signals will then be an accurate representation of the rate of fluid flow through the tube 33.

Figure 5:
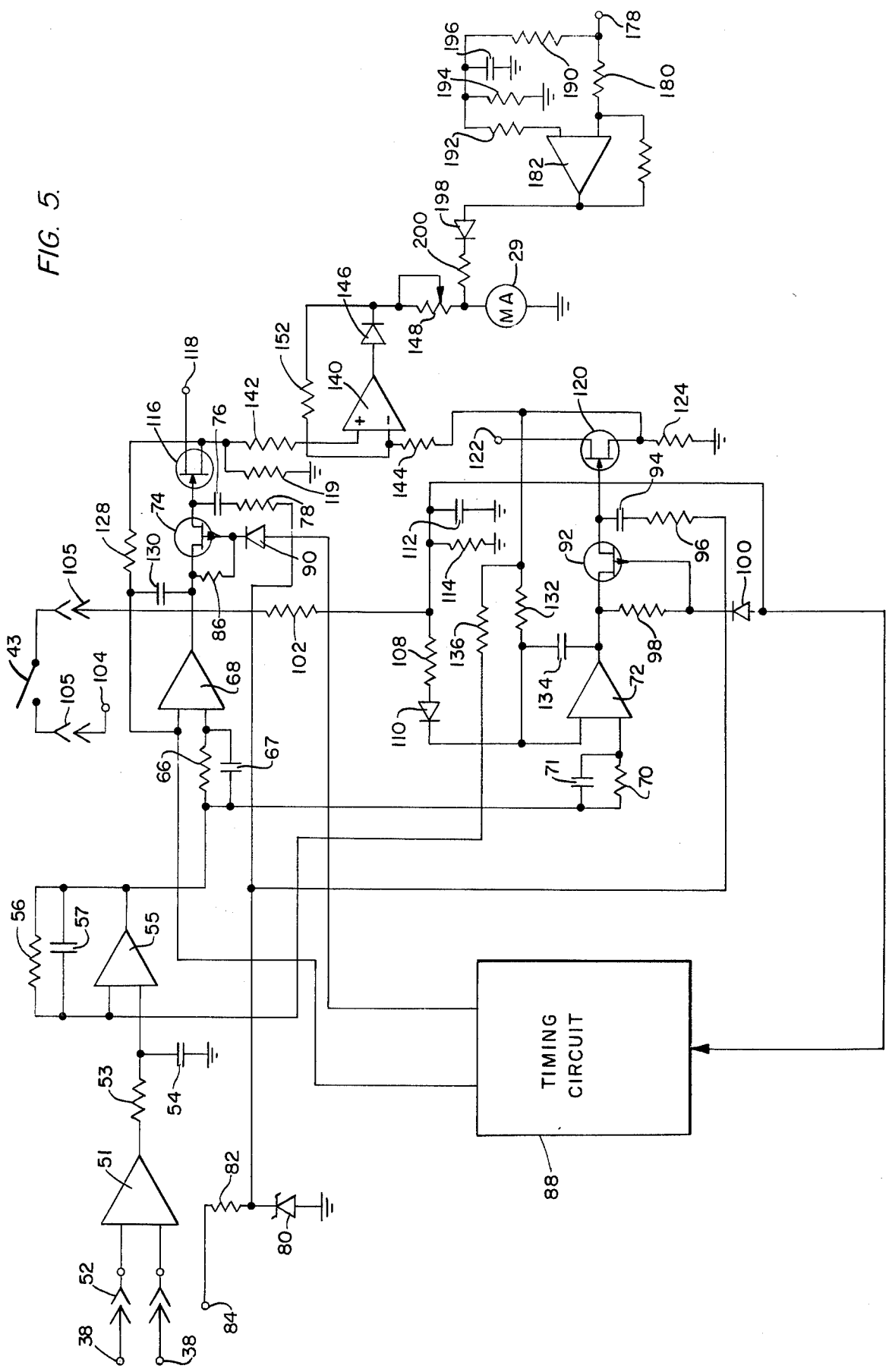
FIG. 5 is a circuit diagram illustrating the electronic measuring circuit of the present invention.

As shown in FIG. 5, which illustrates the electronic circuit for storing the signals and measuring the difference between the stored signals, the two probes 38 are connected to opposite ends of the inputs of a fixed gain differential amplifier 51 through connections 52 provided by the plug 47 and receptical 46. The output of the differential amplifier 51 is connected over a 100 kilohm resistor 53 to the positive input of a high gain differential amplifier 55, which input is also connected to ground through a 1 microfarad capacitor 54. The resistor 53 and capacitor 54 filter high frequency components out of the signal. A parallel circuit of a 6.2 megohm resistor 56 and a 0.005 microfarad capacitor 57 is connected between the output of the amplifier 55 and the negative input thereof to make it function as an operational amplifier and stabilize the system.

The output voltage of the amplifier 55 is applied through a parallel circuit of a 1 megohm resistor 66 and a 24 microfarad capacitor 67 to the positive input of a Norton current input differential amplifier 68. Similarly, the output of the differential amplifier 55 is also connected through a 1 megohm resistor 70 and a 24 microfarad capacitor 71 to the positive input of a Norton current input differential amplifier 72. Ten picofarad capacitors 130 and 134 connect the outputs of the amplifiers 68 and 72 to the minus inputs thereof for stabilization and to prevent transients from overdriving and swamping the amplifiers 68 and 72.

The output of the amplifier 68 is connected to the source of a field effect transistor 74 (FET), the drain of which is connected to one side of a 1 microfarad capacitor 76. The other side of the capacitor 76 is connected through a 100 kilohm resistor 78 to a positive reference potential provided at the anode of a Zener diode 80. The anode of the diode 80 is connected through a 1 kilohm resistor 82 to a positive 13 volt supply provided at terminal 84. The cathode of the Zener diode 80 is connected to ground. The gate of the FET 74 is connected through a 1 megohm resistor 86 to the source of the FET 74 and also to the output of a timing circuit 88 through a diode 90 poled to pass a positive signal from the timing circuit 88 to the gate of the field effect transistor 74.

The output of the differential amplifier 72 is connected to the source of an FET 92, the drain of which is connected to one side of a 1 microfarad capacitor 94. The other side of the capacitor 94 is connected through a 100 kilohm resistor 96 to the positive reference voltage at the anode of the Zener diode 80. The gate of the FET 92 is connected to the source thereof thorugh a 1 megohm resistor 98 and through a diode 100 and a 100 ohm resistor 102 to one side of the reed switch 43, the other side of which is connected to a 18 volt supply provided at terminal 104. The connections between the reed switch 43 and the 18 volt supply and the electronic circuit is provided by the receptical 46 and plug 47 and are designated by the reference number 105. The diode 100 is poled to pass a positive signal voltage from the positive supply at terminal 104 to the gate of the field effect transistor 92. The junction between the diode 100 and the resistor 102 is connected to the input of the timing circuit 88 and is also connected through a 1 megohm resistor 108 and a diode 110 to the negative input of the differential amplifier 72. The diode 110 is poled to pass a positive signal voltage to the negative input of the differential amplifier 72.

The drain of the FET 74 which connects to the capacitor 76 is also connected to the gate of an FET 116, the drain of which is connected to a positive +13 volt supply applied at a terminal 118 and the source of which is connected through a 10 kilohm resistor 119 to ground. Similarly, the drain of the FET 92 connected to the capacitor 94 is connected to the gate of an FET 120, the drain of which is connected to a positive 13 volt supply applied at a terminal 122 and the source of which is connected to ground through a 10 kilohm resistor 124. The FETs 74 and 92 have P-type conducting channels whereas the FETs 116 and 120 have N-type conducting channels. The source of the FET 116 is connected through a 1 megohm resistor 128 to the minus input of the differential amplfiier 68. This resistor provides negative feedback to the amplification channel comprising the differential amplifier 68 and the FETs 74 and 116 so that when the FET 74 is turned on, the capacitor 76 will charge to a voltage to equal that which is applied to the plus input of the differential amplifier 68. Similarly, the source of the FET 120 is connected through a 1 megohm resistor 132 to the minus input of the differential amplifier 72 so as to charge the capacitor 94 in the same manner to a voltage to equal that applied to the positive input of the differential amplifier 72. A negative feedback connection in the form of a 100 kilohm resistor 136 is connected between the source of the field effect transistor 120 and the negative input of the differential amplifier 55 to prevent swamping by transients by holding the effective gain of amplifier 55 low until FET 92 is turned off.

As the portable unit 10 of the flowmeter is being moved into position over the special pipe section 12, the signal voltage produced between the probes 38 will be amplified by the instrumentation amplifier 51 and applied by the amplifier 55 to the amplifiers 68 and 72. The signal voltage applied to the amplifier 68 will be transmitted by the FET 74 and stored on a capacitor 76. The signal voltage applied to the amplifier 72 will be transmitted by the FET 92 and stored on the capacitor 94. As the meter housing is approaching the special section of pipe, the magnetic field extending out in front of the housing will act on the reed switch 43 and cause it to close. This closure will take place before the main strength of the magnetic field between the two pole pieces of the magnet is applied across the fluid flowing through the pipe section. When the switch 43 closes, it causes a positive bias to be applied to the gate of the FET 92 cutting the FET 92 off and thus storing a signal voltage corresponding to the voltage produced between the two probes 38 at the time the switch 43 closes. This signal voltage is stored on the capacitor 94. Closure of the switch 43 also applies a positive voltage through the resistor 108 and the diode 110 to the minus input of the amplifier 72 driving the output of the amplifier 72 to a low level to prevent it from affecting the stored voltage. Also, the turning off of FET 92 opens the feedback loops formed by resistor 136, amplifiers 55, resistor 70 and amplifiers 72. This effectively increases the gain of amplifier 55 for ensuing signals making the system more sensitive during the measurement period. The positive voltage applied to the switch 43 is also applied to the timing circuit 88. The timing circuit 88 responds to the applied positive signal applied by the switch 43 and three-fourths of a second later will apply a positive signal voltage to the gate of the FET 74 cutting the FET 74 off and storing the final voltage on the electrodes. Prior to the cutoff of the FET 74, the output signal voltage of the amplifier 68 proportional to the voltage produced between probes 38 will continue to be stored on the capacitor 76 and by the time that the FET 74 is cut off, three-fourths of a second after the switch 43 closes, the pole pieces of the permanent magnet will be positioned directly over the pipe section through which the fluid is flowing. Accordingly, the voltage stored on the capacitor 76 will correspond to the rate of fluid flow. At the same time that the timing circuit 88 applies a positive voltage to the FET 74 to cut it off, it will also apply a positive voltage to the minus input of the differential amplifier 68 to drive its output to a low level to prevent the amplifier from affecting the stored voltage.

In the manner described above, the circuit of FIG. 5 stores a voltage on the capacitor 94 corresponding to the voltage between the probes 38 as the permanent magnet is being brought into position over the pipe section through which the fluid is flowing. Then three-fourths of a second later, after the pipe section is directly between the pole pieces of the permanent magnet, a signal voltage proportional to the voltage between the probes 38 will be stored on the capacitor 76.

The FETs 116 and 120 apply the stored signal voltages on the capacitors 76 and 94 to opposite sides of a Norton current input differential amplifier 140 through 1 megohm resistors 142 and 144, respectively. The differentail amplifier 140 amplifies the difference between the two applied voltages and applies it through a diode 146 and a 5,000 ohm variable resistor 148 to one side of the milliameter 29, the other side of which is grounded. The diode 146 is poled to pass a positive signal voltage only. A 1 megohm resistor 152 is connected from the junction of the diode 146 and the variable resistor 148 and the input of amplifier 140 to which the resistor 144 connects. Variable resistor 148 sets the "gain" of the system.

The +18 volt source which is supplied by a battery is also applied to terminal 178 which is connected over a 3.3 megohm resistor 180 to the plus input of a differential amplifier 182. The +18 volts on terminal 178 is also connected over a 300 kilohm resistor 190 and a 1 megohm resistor 192 to the minus input of the differential amplifier 182. The junction between the resistors 190 and 192 is connected to ground through a parallel circuit of a 1 megohm resistor 194 and a 22 microfarad capacitor 196. The output of the amplifier 182 is connected over a diode 198 and a 22 kilohm resistor 200 to the ungrounded side of the milliameter 29. The differential amplifier 182 applies a signal voltage to the milliameter 29 depending upon the voltage applied to the terminal 178 and the milliameter 29 will therefore provide a reading of the battery voltage so as to indicate whether the battery needs replacing. When the unit is being used to make a flow measurement, the positive output of the differential amplifier 140 representing the flow rate will back bias the diode 198 to prevent the signal from the amplifier 182 indicating the battery level from interfering with the flow rate reading.

The meter 29 will provide a reading of the difference between the voltages stored on the capacitors 76 and 94. Since this difference in voltage will calibrate accurately with the flow rate through the special pipe section, the meter 150 will provide an accurate indication of this flow rate. Because the measurement depends upon a difference between the voltage produced between the probes 38 as the magnet approaches the pipe section, and the voltage produced three-fourths of a second later when the full strength of the magnet is applied to the pipe section, the measurement will not be affected by the large drifts that occur with time in the value of the signal voltage produced between the probes and will represent an accurate measurement of the rate of flow.

I claim:

1. A flowmeter comprising a conduit for defining a path for fluid flow, magnetic means for generating a magnetic field, said magnetic means being movable with respect to said conduit between a position remote from said conduit and a predetermined position proximate to said conduit in which the magnetic field generated thereby passes through said conduit and is applied to any fluid flowing through said conduit in a direction transverse to the direction of fluid flow in said conduit, a pair of electrical probes positioned to contact the fluid flowing in said conduit where the magnetic field is applied when said magnetic means is in said predetermined position, said probes contacting the fluid flowing in said conduit along a line extending transversely to the direction of fluid flow and to the direction of the magnetic field when said magnetic means is in said predetermined position, and signal means to detect the voltage produced across said probes at a time when the strength of the magnetic field applied to the fluid in said conduit at said probes is less than the strength of the field applied when said magnetic means is in said predetermined position and to detect the voltage produced across said probes when said magnetic field is in said predetermined position.

2. A flowmeter as recited in claim 1, wherein said means to generate said magnetic field comprises a permanent magnet.

3. A flowmeter as recited in claim 1, wherein said signal means comprises means to detect the approach of said magnetic field to said conduit and to store a value proportional to the voltage produced across said probes when the approach of said magnetic field is detected and to detect the voltage produced across said probes at a predetermined time interval after the approach of said magnetic field has been detected.

4. A flowmeter as recited in claim 1, wherein said signal means comprises means to store a first signal proportional to the voltage produced across said probes immediately prior to the arrival of said magnetic means at said predetermined position and to store a second signal proportional to the voltage produced across said probes immediately after the arrival of said magnetic means at said predetermined position.

5. A flowmeter as recited in claim 4 further comprising means to measure the difference in value of said first and second signals stored by said signal means.

6. A method of measuring the rate of fluid flow comprising positioning a pair of electrical probes in said fluid flow sapced along a line extending transversely to the direction of said fluid flow, moving a magnetic field generating means from a position remote from said probes to a predetermined position proximate to said probes in which the magnetic field produced by said magnetic field generating means is applied to said fluid flow at the position of said probes transversely to the direction of said fluid flow and to the direction of said line, measuring the voltage produced across said probes immediately prior to arrival of said magnetic field at said predetermined position and measuring the voltage produced across said probes immediately after the arrival of said magnetic field at said predetermined position.

* * * * *